United States Patent
Avila

(10) Patent No.: US 9,992,972 B2
(45) Date of Patent: Jun. 12, 2018

(54) PET FEEDER WITH REPLACEABLE INSECT TRAP

(71) Applicant: Edward Avila, Indio, CA (US)

(72) Inventor: Edward Avila, Indio, CA (US)

(*) Notice: Subject to any disclaimer, the term of this patent is extended or adjusted under 35 U.S.C. 154(b) by 105 days.

(21) Appl. No.: 15/168,685

(22) Filed: May 31, 2016

(65) Prior Publication Data

US 2017/0339919 A1    Nov. 30, 2017

(51) Int. Cl.
| | |
|---|---|
| *A01K 5/01* | (2006.01) |
| *A01M 1/14* | (2006.01) |
| *A01M 1/02* | (2006.01) |
| *A01M 1/10* | (2006.01) |
| *F24F 9/00* | (2006.01) |

(52) U.S. Cl.
CPC ............. *A01K 5/0142* (2013.01); *A01M 1/02* (2013.01); *A01M 1/103* (2013.01); *A01M 1/106* (2013.01); *A01M 1/145* (2013.01); *F24F 9/00* (2013.01)

(58) Field of Classification Search
CPC ...... A01K 5/0142; A01M 1/103; A01M 1/106
See application file for complete search history.

(56) References Cited

U.S. PATENT DOCUMENTS

| | | | | |
|---|---|---|---|---|
| 4,802,302 | A * | 2/1989 | Alnafissa | A01K 5/0142 119/61.53 |
| 9,179,662 | B1 * | 11/2015 | Kort | A01M 1/02 |
| 2003/0154644 | A1 * | 8/2003 | Lambert | A01M 1/145 43/107 |
| 2006/0242891 | A1 * | 11/2006 | Marshall | A01K 5/0142 43/131 |
| 2016/0050901 | A1 * | 2/2016 | Pugh | A01M 1/223 43/112 |

* cited by examiner

*Primary Examiner* — Daniel J Colilla
(74) *Attorney, Agent, or Firm* — Omni Legal Group; Omid E. Khalifeh

(57) ABSTRACT

A pet feeder is provided to redirect pests such as insects and bugs attracted to the scent of exposed pet food, trap the redirected pests, and further prevent untrapped pests from contaminating any exposed pet food. The feeder may comprise a hollow holder configured to suspend a portion of a pet food receptacle in the hollow space. Such holder may comprise a plurality of apertures disposed thereon, and UV lights and attractive scents may be provided to redirect the pests from the pet food by attracting them into the hollow interior of the holder. Then, the pests may be trapped in the hollow interior by way of replaceable traps such as flypaper. Additionally, fans may be disposed on the holder and configured to define a forceful barrier that prevents any untrapped pests from contaminating pet food by the entering a space immediately above the pet feeder.

8 Claims, 4 Drawing Sheets

PET FEEDER WITH REPLACEABLE INSECT TRAP

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to pet feeding apparatuses and, more particularly, to an apparatus for, in one aspect, attracting and trapping insects, bugs, and other pests posing a nuisance in an area surrounding the pet feeder, and, in another aspect, preventing such insects from contacting and potentially contaminating a pet's exposed food.

BACKGROUND

Many households have pets that are routinely fed in or near human living spaces. This may insure that their food intake can be monitored by their owners and also that they remain reasonably safe from dangerous conditions associated with hunting and foraging for their meals. Thus for example, many dogs and cats may be fed various dry and wet foods from bowls placed on the floor of a kitchen or other convenient room in the pet owner's house. Some pets are fed on porches just outside of a pet owner's home, or even in an owner's back yard. In any case, pet food and any residue and remnants thereof may attract scavenging pests, such as flies, ants, and other insects and bugs.

Scavenging flies, insects, and bugs may not just become a nuisance to pets and pet owners who might be afraid of or annoyed by the presence of such pests, but they may also contaminate the pet food and cause illness by spreading foodborne bacteria and disease.

Some proposals for preventing contamination of exposed pet food include, for example, bowls configured to automatically deposit food into such bowls at a particular time. It is contemplated that such configurations prevent food from being exposed for prolonged periods of time, minimizing the chance for insects and bugs to become attracted to scents associated with the food. However, some pets are apt to graze rather than eat all of their food in a single sitting. Timely deposited food for grazing pets, then, may still be exposed and attractive to pests over prolonged periods. Even when pets do eat deposited food in a single sitting, any residue and crumbs leftover from the meal may remain exposed to attract various bugs and insects. Thus, another proposal has been to provide lidded pet feeders. Though this solution may physically obscure foodstuff from direct contact by bothersome pests, this solution likewise prevents animals apt to graze from eating whenever they please because their food is obscured by a lid.

Some other proposals have included various means configured to trap and/or terminate insects attracted to pet food. For instance, U.S. Pat. No. 4,802,302 to Alnafissa discloses a pet food dish comprising sticky adhesive strips scented to attract crawling insects fastened circumferentially to an outside of a base of the pet food dish. This, however, is deficient, because removal of the adhesive strips with trapped insects may be a difficult endeavor for those who are disgusted by flies and insects. Another proposal is U.S. Pat. No. 6,065,428 to Fronk which teaches a pet dish having a pedestal configured to space apart a top and bottom portion of a pet dish, with a strip of repellant insecticide disposed in such space. This proposal is deficient, though, because it fails to address the problem of flying insects which may also pose contamination threats and nuisance. U.S. Pub. No. 2006/0242891 filed by Marshall teaches a container configured to kill, repel, or trap insects attracted to the contents of the container. This proposal, however, also fails to prevent flying insects from accessing exposed foodstuffs.

Thus, there remains a need for a pet feeder configured to trap undesirable pests such as insects and bugs attracted to pet food contained therein and that is also configured to prevent contamination of such pet food.

SUMMARY

The present disclosure is directed to a pet feeder assembly having various elements configured to redirect pests, such as insects and bugs, near to the pet feeder and attracted from any food or remnants contained therein, to trap such redirected pests, and further prevent untrapped pests from contaminating exposed pet food.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the pet feeder assembly may comprise a holder having a top portion and a bottom portion spaced apart by one or more side portions to define a hollow interior. The top portion may be configured to suspend at least one pet food receptacle, such as any pet food bowl known to those skilled in the art and readily available in the marketplace, in the hollow interior and above the bottom portion of the holder. For example, many pet food bowls comprise a concave bowl portion having a upper edge defined by a flange. An aperture may be disposed on the top portion of the holder to receive the concave bowl portion into the hollow interior while the flange may rest on the top portion of the holder, so that the bowl may be suspended above the bottom portion of the holder.

A plurality of additional apertures may be disposed in the top portion and any side portions of the holder to ensure that the hollow interior is accessible to variously sized pests, such as bugs and insects. It should be noted, though, that although the word "bug" refers technically to an order of insects, the word "bug" may also be familiar to those skilled in the art as referring colloquially to various arthropods belonging to various classes of terrestrial and/or amphibious invertebrates. Thus, applicability of the invention should not be limited to trapping and repulsion of bugs or insects, but rather may be utilized to repel and trap any number of pestilent critters which may be attracted to exposed pet food. As such, the words should be considered interchangeable.

Means for redirecting any pests attracted to pet food and residue in the receptacle may be provided to ensure that nearby pests avoid the exposed food in favor of entry into the hollow interior of the holder via the plurality of apertures in the top and side portions. For example, and not limitation, many insects are known to be positively phototactic and tend to move toward a stimulus of light. Short wave ultra violet ("UV") lights may be particularly attractive to some classes, thus it may be desirable to replaceably fix UV bulbs in the hollow interior of the holder. As such, in some embodiments, means for redirecting the insects, bugs, and other pests attracted to pet food may comprise light bulbs replaceably fixable in the interior of the holder to attract insects, bugs, and other pests into the hollow interior. It should be noted that any apertures disposed on the holder may be placed and sized not only to ensure that pests are able to enter the hollow interior of the holder, but also so that any light therein may be emitted from, and thus visibly attractive to, nearby pests that might be otherwise tempted to sample exposed pet food.

Of course, other types of lights are contemplated, and UV range lights are offered by way of example only, and not of limitation. Additionally, one skilled in the art will recognize that light bulbs replaceably fixed in the hollow interior of the holder may be powered by various means. For instance, in some embodiments, the light bulbs may be electrically coupleable to a power outlet in a pet owner's home. In another embodiment, the light bulbs may be battery or even solar powered. The light bulbs may also be defined by any desirable wattage. For example, it is contemplated that it may be desirable to replaceably fix a light bulb of about 5 watts to about 40 watts in the hollow interior of the holder.

Replaceable means for trapping any pests attracted to the hollow interior may also be provided. In an embodiment, means for trapping pests may comprise an adhesive sheet, such as disposable flypaper known to those skilled in the art. Thus, for example, when an insect such as a housefly enters the holder by way of one of the apertures disposed on the holder, it may become stuck on adhesive and unable to exit the hollow interior. Insecticide or poison may comprise, in part, any substance defining the composition of the adhesive to quickly terminate the pest, however, such composition should not limit the invention. Indeed, any non-drying adhesive may be sufficient to practice the invention.

An aperture may be particularly disposed on a portion of the sidewall to enable placement of the means for trapping pests within the hollow interior of the holder. In an embodiment in which the means for trapping comprises an adhesive sheet, it is contemplated that the aperture may be elongated and placed on a portion of the sidewall in line with the bottom portion to slidably receive the sheet. This particular arrangement may allow a pet owner to avoid folding, bending, or undesirably touching adhesive portions of the sheet—with itself or with his own skin—while placing and replacing traps within the hollow interior. Indeed, it is even contemplated that a tray slideably mateable with the elongated aperture may be provided to even further ease placement and replacement of means for trapping pests within the hollow interior. For instance, in some embodiments, a sheet of adhesive material may be placed on a tray, then the tray may be slid through the elongated aperture so that the tray and adhesive material are together housed within the hollow interior along the bottom portion of the holder. Any powered lights within the hollow interior may shine through the plurality of apertures in the holder to visually attract nearby pests, which may then enter the holder via such apertures. Once inside, the pests may become trapped. When a number of pests have been collected on the sheet of adhesive material, or at any other desirable time, a pet owner may slideably remove the tray and sheet, dispose of the sheet, and place a new sheet on the tray. This slideable action may, in some instances, desirably permit a pet owner to avoid directly touching a used trap over the course of replacement.

It is contemplated that the pet feeder assembly may further comprise alternative or even additional means for redirecting nearby pests into the hollow interior of the holder. For instance, in some embodiments, scented attractants may be placed within the holder to redirect pests from pet food. One such scent may be a sweet scent. As a non-limiting example, tree rosin is sticky, sweetly and attractively scented to some pestilent insects and also known to be a natural insecticide. Thus, it may be desirable to provide a sheet comprising, in whole or in part, tree rosin. Another attractive scent may be a floral scent. Still another scent may comprise biologically attractive pheromones. In some embodiments, adhesive material comprising the means for trapping pests may itself comprise compositions that are attractively scented to pests. Of course, one skilled in the art will recognize that many scents are available for use that are attractive to pests including insects and other arthropods, thus the foregoing are offered by way of example only and not of limitation.

In one embodiment, the pet feeder may even further comprise means for preventing any untrapped insects, bugs, and/or other pests from contaminating food and/or water contained in the at least one pet food receptacle. For instance a fan may be integrated into the body of the holder and operative to create forceful turbulence in a space directly above the one or more pet food receptacles. It is contemplated that such turbulence may be so forceful to a pestilent insect, such as a housefly, that it may be physically unable to overcome the turbulence generated by the fan to land in and contaminate the pet's food and/or water bowl. In some embodiments, a second fan may be integrated into the body of the holder in a position opposite the first fan to concentrate turbulence in the space directly above the one or more pet food receptacles. It is contemplated that the fan or fans may not necessarily be integrated into the body of the holder, though, but may instead be removably securable to the holder.

In some embodiments, the fan or fans may be electrically powered. Indeed, additional elements, such as a timer switch and even motion sensor are contemplated in the even that a pet owner desires to automate operation of the fans, minimize energy consumption, and even decrease any possible disturbance operation of the fans might cause his pets.

Thus, it is an object of the invention to redirect insects and other pests attracted to exposed pet food and residue from any pet food that has already been eaten to an area that is removed from any surface food.

It is still another object of the invention to trap insects and other pests in an area that is removed from any surface of the pet food.

It is another object of the invention to forcibly prevent untrapped insects and other pests from possibly contaminating exposed pet food.

It is yet another object of the invention to ease removal of trapped insects and pests.

One or more of the above-disclosed embodiments, in addition to certain alternatives, are provided in further detail below with reference to the attached figures. The disclosed subject matter is not, however, limited to any particular embodiment disclosed.

Figure 1:
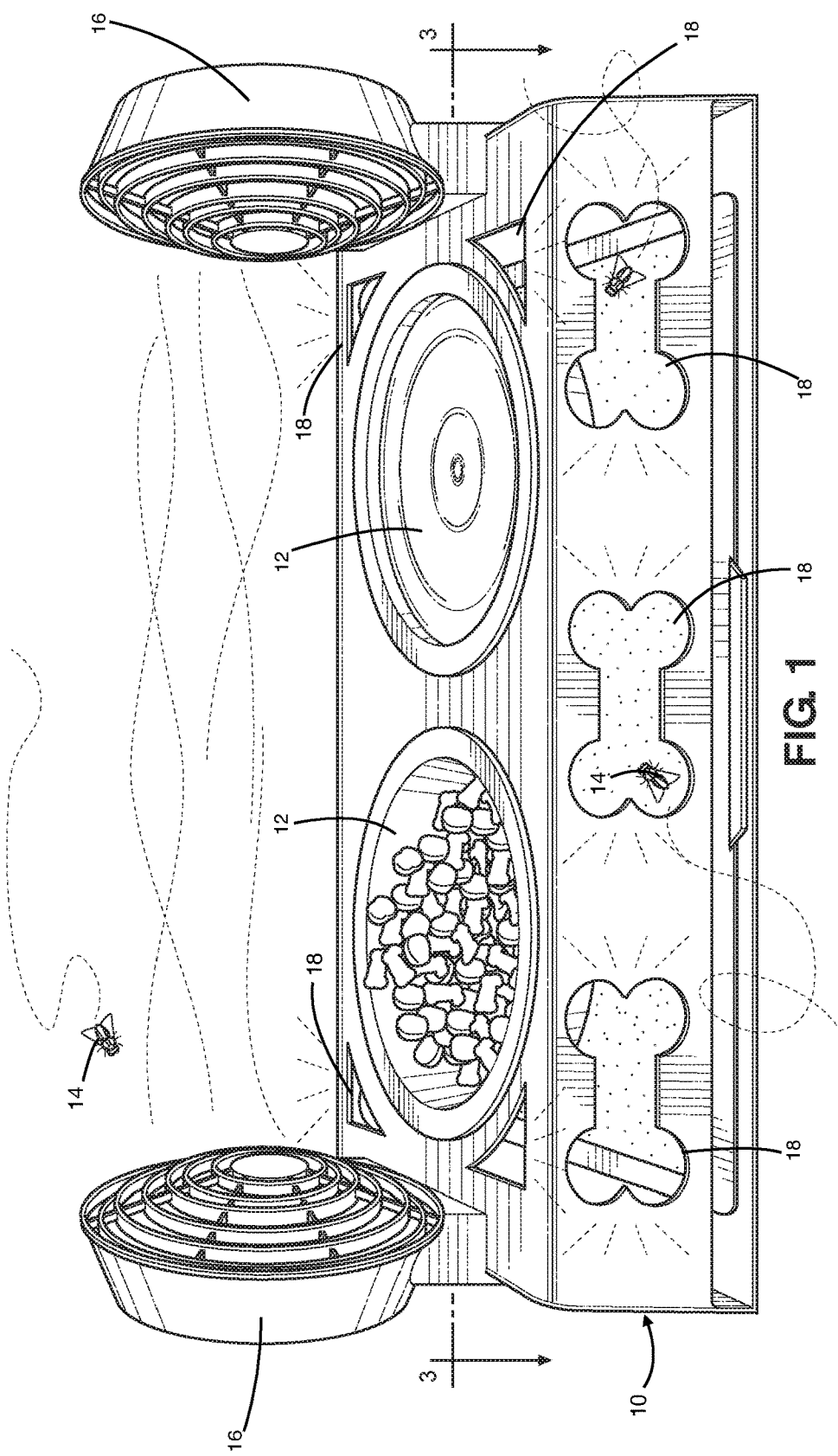
FIG. 1 shows a perspective view of an embodiment of the pet feeder with replaceable insect trap.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

With reference to FIG. 1, one embodiment of the pet feeder may comprise a hollow holder 10 configured to support one or more pet food receptacles, such as commonly known bowls 12 configured to separately hold pet food and water. Means for forcibly preventing pests, such as houseflies 14, from coming into contact with and contaminating any contents of such bowls 12 may comprise one or more electrically powered fans 16 configured to generate turbulence in a space directly above the bowls 12. Of course, other pests may also be prevented from contaminating any contents of the bowls 12, however, flies are depicted as a non-limiting example of such pests simply for their relatively large size and ease of illustration.

A plurality of apertures 18 may be disposed in various positions on the holder 10 to receive flies 14 and other pests into the holder 10 so that such pests, prevented from contaminating exposed water and pet food and/or remnants thereof, may be further redirected to an area that is away from such food and water. It is contemplated that redirecting pests in this manner may ease discomfort experienced by pet and pet owner alike upon viewing pests because such pests will be directed to and subsequently trapped within an enclosed space out of sight in a manner that may be better understood with reference to FIG. 2.

In an embodiment, the holder 10 may comprise a top portion 22 and a bottom portion 24 spaced apart by one or more side portions 26 to define a hollow interior 28. In the drawings, the holder 10 is illustrated as a generally rectangular prism in shape. Thus, in accordance with one embodiment, the side portion 26 may comprise four walls joined to define angled edges 25, however, it will be apparent to one skilled in the art that the side portion 26 may comprise as many or as few pieces as desired. For instance, the shape of the holder 10 may be cylindrical instead. In such an embodiment, the side portion may comprise a single, smooth wall. As such, the embodiment depicted should not limit the disclosure.

Figure 3:
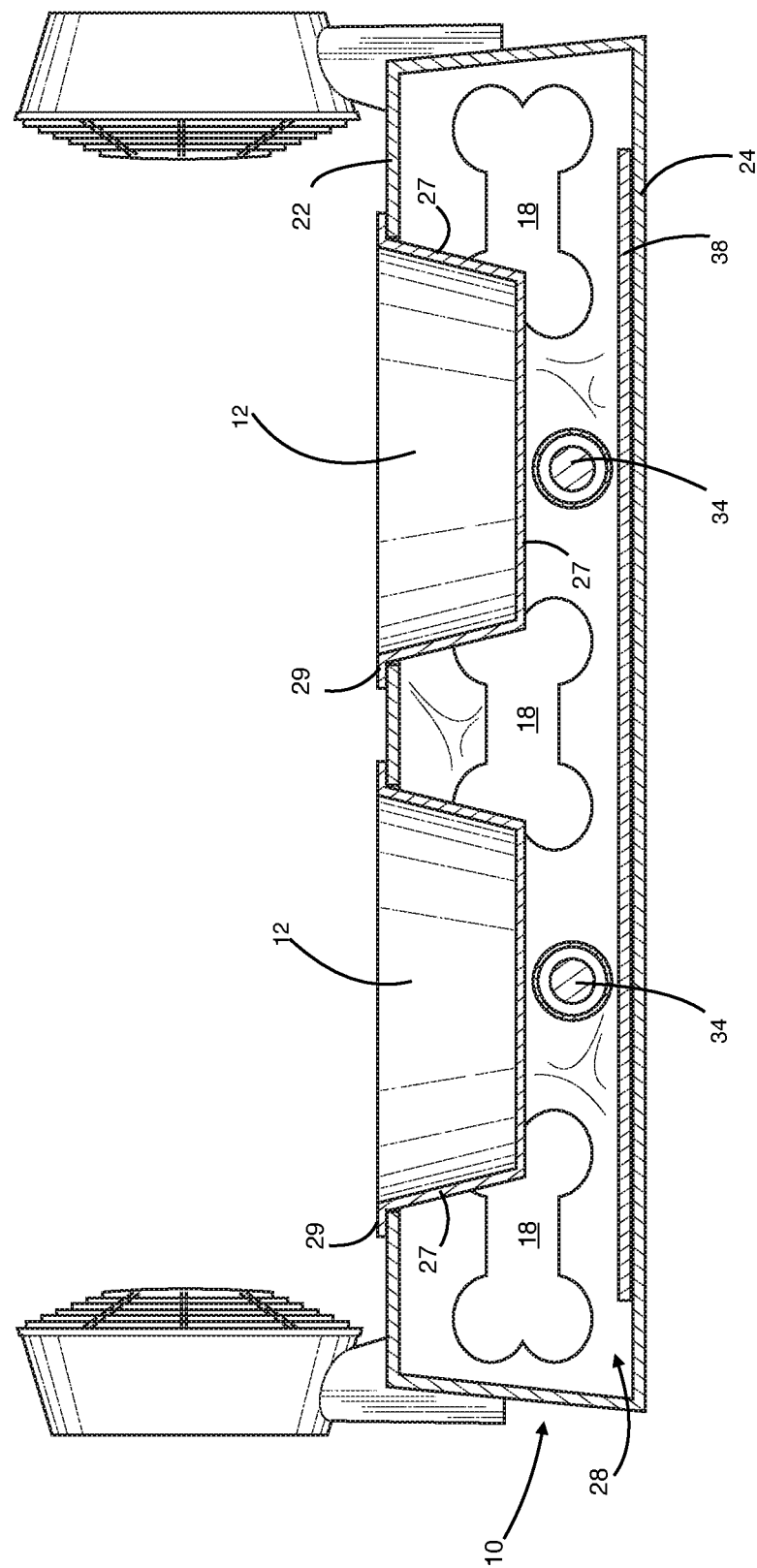
FIG. 3 is a cross-sectional view along lines 3-3 of FIG. 1 of an embodiment of the pet feeder with replaceable insect trap.

The top portion 22 may be configured to suspend one or more pet food receptacles, again drawn as bowls 12 known in the art, in the hollow interior 28 and above the bottom portion 24 of the holder 10. For example, many pet food bowls comprise a concave bowl portion 27 having a upper edge defined by a flange 29. An aperture 32 may be disposed on the top portion 22 of the holder 10 to receive one each of the concave bowl portions 27 into the hollow interior 28, as demonstrated in the cross-sectional view in FIG. 3, while the flange 29 may rest on the top portion 22, so that the bowl 12 may be suspended above the bottom portion 24 of the holder 10. Means for suspending one or more pet food receptacles are also contemplated, however. In one embodiment, for example, wired or elastic supportive structures may be configured in the hollow interior 28 of the holder 10 beneath apertures 32 to support the concave bowl portions 27 above the bottom portion 24.

Returning reference to FIG. 2, means for redirecting any pests attracted to pet food and residue may be provided to ensure that nearby pests avoid scavenging the exposed food in favor of entering the hollow interior 28 of the holder 10 via the plurality of apertures 18, which are shown to be disposed in the top and side portions 22, 26 of the holder 10. For example, and not limitation, many insects commonly attracted to prepared foodstuffs are known to be positively phototactic and tend to gravitate toward a stimulus of light. This may be true of any type of light, though short wave UV lights may be particularly attractive to pests such as the illustrated houseflies. Thus, in an embodiment, means for redirecting pests may comprise one or more lightbulbs 34 that are fixable within the hollow interior 28 of the holder 10 replaceable at the will of the pet owner.

Placement of any light bulbs may be chosen so that contact with the pet food receptacle(s) and bottom portion of the holder are avoided. Thus, in FIG. 3, the light bulbs 34 are shown to be fixed in a position that is below the bowls 12 suspended in the hollow interior 28, but above the bottom portion 24 of the holder 10. It is contemplated that such placement may ensure that any physical interference with light emissions is minimized to the extent practicable, though other placements are possible and should not be precluded by the disclosure. It should be noted that any apertures 18 disposed on the holder 10 may be placed and sized not only to ensure that bothersome pests are able to enter the hollow interior 28 of the holder 10, but also so that any emissions from light bulbs 34 contained therein may be emitted from, and thus visibly attractive to, nearby pests that might be otherwise prone to approach a pet's exposed food.

Of course, other types of lights are contemplated, and UV range lights are offered by way of example only, and not of limitation. The light bulbs 34 may also be defined by any desirable wattage. For example, it is contemplated that it may be desirable to replaceably fix one or more light bulbs 34 of about 5 watts to about 40 watts in the hollow interior of the holder. Additionally, one skilled in the art will recognize that light bulbs replaceably fixed in the hollow interior of the holder may be powered by various means. Again returning to FIG. 2, it may be seen that the light bulbs 34 may be electrically coupleable to a power source such as a power outlet or batter pack via juncture 36.

Replaceable means for trapping any pests attracted to the hollow interior 28 may also be provided. In an embodiment, means for trapping pests may comprise an adhesive sheet 38. The adhesive sheet 38 may be, for example, disposable flypaper known to those skilled in the art to have a layer of sticky substance 40 configured to prevent pests in contact with the substance from removing themselves from it until poison or starvation causes such pests to die. Thus, for example and with reference to FIG. 3 in particular, when an insect such as a housefly 14 enters the holder 10 by way of one of the apertures 18 disposed on the holder, the housefly 14 may become stuck on the sheet of adhesive material 38 and unable to exit the hollow interior 28. Insecticide or poison may comprise, in part, any substance defining the composition of the sheet of adhesive material 38 to quickly terminate the pest, however, such composition should not limit the invention. Indeed, any non-drying adhesive may be sufficient to practice the invention.

With reference again to FIG. 2, another aperture 42 may be particularly disposed on a portion of the sidewall 26 to enable placement of the means for trapping pests within the hollow interior 28 of the holder 10. In an embodiment in which the means for trapping comprises an adhesive sheet 38, it is contemplated that the aperture 42 may be elongated and placed on a portion of the sidewall in line with the bottom portion 24 to slidably receive the sheet 38. In some embodiments, the particular dimensions of the elongated aperture 42 may be chosen to minimize the chance that an officious pet meddle with the means for trapping pests. For instance, the elongated aperture 42 in the drawings is shown to have little height in comparison to its width. In other words, the elongated aperture 42 may be formed as a thin slot. This may prevent a pet from putting its paw into the hollow interior 28 and getting its paw stuck on the adhesive sheet 38. Additionally, this particular arrangement may allow a pet owner to avoid folding, bending, or undesirably touching any part of the sticky substance 40 of the sheet 38—with itself or with his own skin—while placing and replacing traps within the hollow interior.

Figure 2:
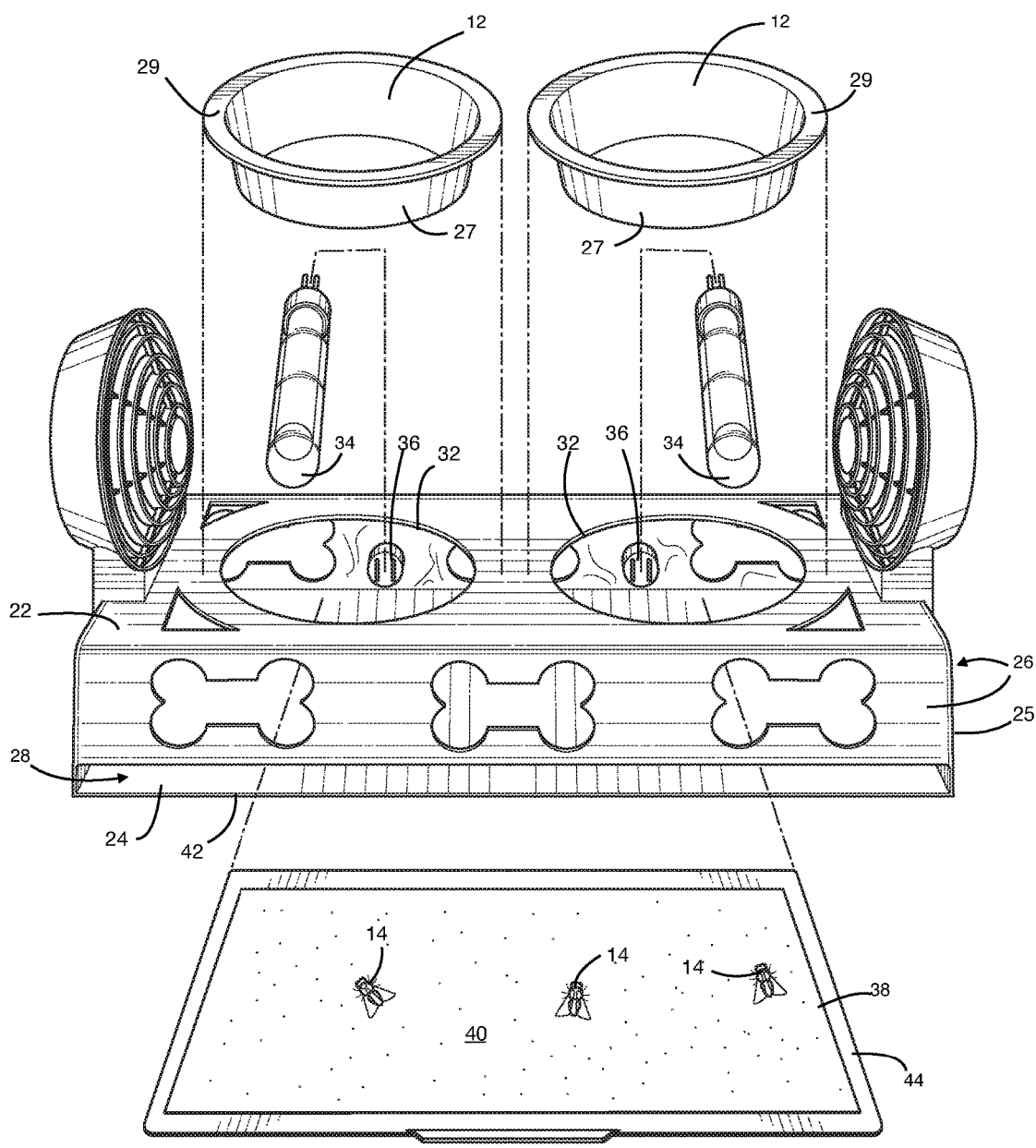
FIG. 2 illustrates an exploded view of an embodiment of the pet feeder with replaceable insect trap.
Figure 4:
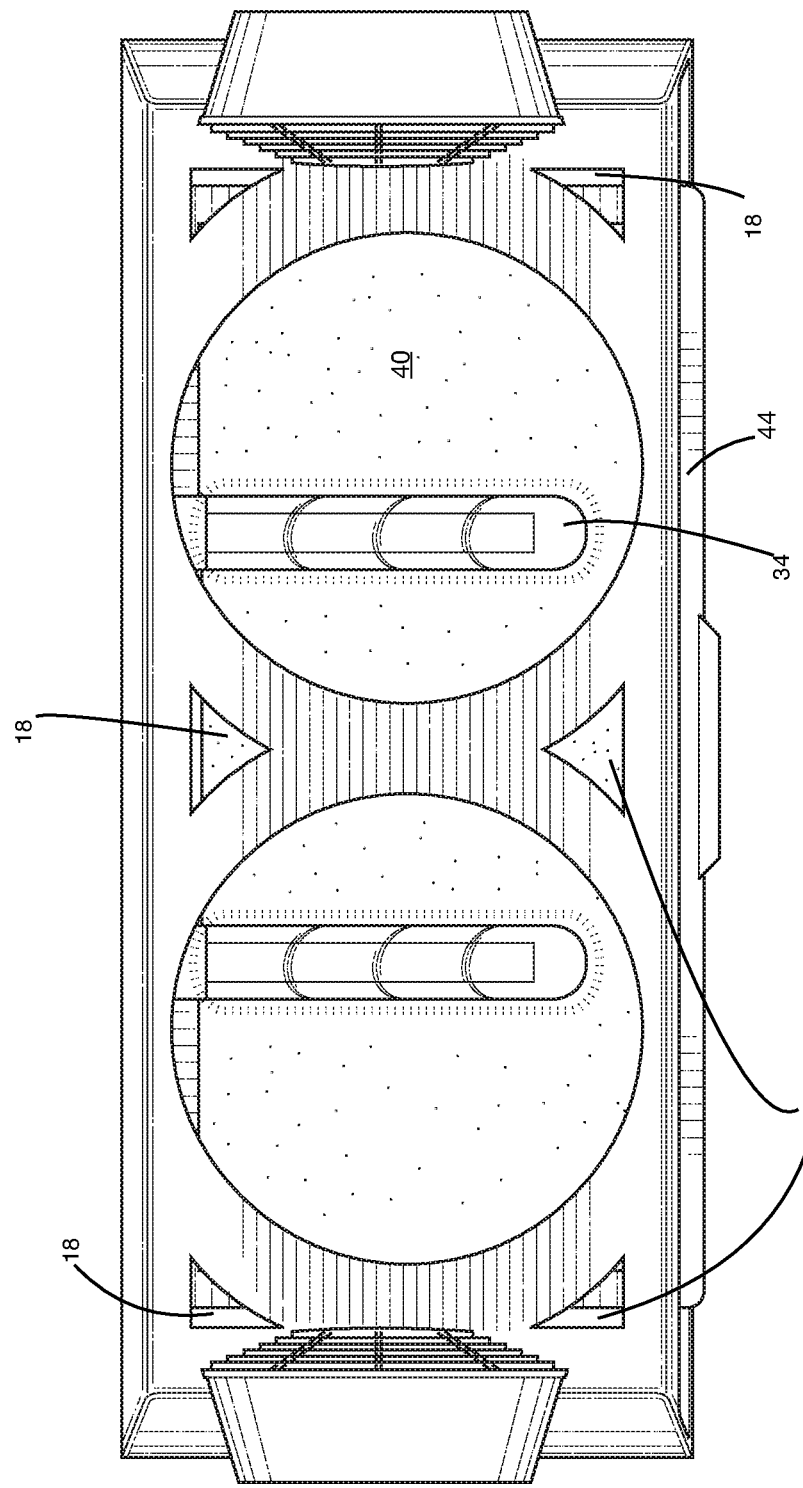
FIG. 4 shows an overhead plan view of an embodiment of the pet feeder with replaceable insect trap.

In some embodiments, a tray 44 slideably mateable with the elongated aperture 42 may be provided to even further ease placement and replacement of means for trapping pests within the hollow interior 28. As an example, in practice, a sheet of adhesive material 38 may be placed on a tray 44, then the tray 38 may be slid through the elongated aperture 42 so that the tray and adhesive material may be housed together within the hollow interior 28 along the bottom portion 24 of the holder 10. With reference to FIG. 4, any powered light bulbs 34 within the hollow interior may shine through the plurality of apertures 18 in the holder to visually attract nearby pests, which may then enter the holder via such apertures 18. Once inside, the pests may become trapped on the sticky substance 40. When a number of pests have been collected on the sheet of adhesive material, or at any other desirable time, a pet owner may slideably remove the tray and sheet, as depicted in FIG. 2, dispose of the sheet 38, and place a new sheet on the tray 44. This slideable action may, in some instances, desirably permit a pet owner to avoid directly touching a used trap over the course of replacement.

Thus a pet feeder assembly may comprise various elements configured to simultaneously redirect pests, such as insects and bugs, near to the pet feeder and attracted from any food or remnants contained therein, trap such redirected pests, and further prevent untrapped pests from contaminating exposed pet food.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, height of the pet feeder, as well as volume and shape of the one or more pet food receptacles, may vary depending on the pet intended to be fed with the device. Additionally, various types, forms, and compositions of pest attractant may be applied to the disclosure without departing from the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the pet feeder with replaceable insect trap with which that terminology is associated. In general, the terms used in the following claims should not be constructed to limit the pet feeder with replaceable insect trap to the specific embodiments disclosed in the specification unless the above description section explicitly define such terms. Accordingly, the actual scope encompasses not only the disclosed embodiments, but also all equivalent ways of practicing or implementing the disclosed apparatus. The above description of embodiments of the pet feeder with replaceable insect trap is not intended to be exhaustive or limited to the precise form disclosed above or to a particular field of usage.

While specific embodiments of, and examples for, the apparatus are described above for illustrative purposes, various equivalent modifications are possible for which those skilled in the relevant art will recognize.

While certain aspects of the invention are presented below in particular claim forms, various aspects of the apparatus are contemplated in any number of claim forms. Thus, the inventor reserves the right to add additional claims after filing the application to pursue such additional claim forms for other aspects of the pet feeder with replaceable insect trap.

What is claimed is:

1. A pet feeder assembly, comprising:
a holder having a top portion and a bottom portion spaced apart by one or more side portions to define a hollow interior, the top portion configured to suspend at least one pet food receptacle within the hollow interior and above the bottom portion, the hollow interior accessible to variously sized bugs and insects by way of a plurality of apertures disposed on the top and side portions of the holder;
means for redirecting insects and bugs attracted to pet food and residue in the receptacle into the hollow interior via the plurality of apertures in the top and side portions of the holder;
an elongated aperture disposed on the one or more side portions in line with the bottom portion to receive replaceable means for trapping redirected insects and bugs in the hollow interior of the holder; and
means for preventing nearby insects and bugs from contaminating food and/or water contained in the at least one pet food receptacle.

2. The pet feeder assembly of claim 1, wherein the means for preventing contamination comprises a first and a second fan disposed on the holder opposite the one or more pet food receptacles and operable to create forceful turbulence in a space above the one or more pet food receptacles.

3. A kit for an insect trapping pet feeder, comprising:
a holder configured to define a hollow interior and suspend a portion of at least one pet food receptacle within the hollow interior, the hollow interior accessible to variously sized bugs and insects by way of a plurality of apertures disposed on the holder;
means for redirecting insects and bugs attracted to pet food and residue in the at least one pet food receptacle into the hollow interior via the plurality of apertures disposed on the holder;
replaceable means for trapping redirected insects and bugs within the hollow interior of the holder;
a slidable tray configured to support the replaceable means for trapping redirect insects and bugs and further replace such replaceable means for trapping while avoiding a need to physically touch the means for trapping; and
means for forcibly preventing contamination by insects and bugs of any pet food in the at least one pet food receptacle;
wherein, one of the plurality of apertures is an elongated aperture disposed on a portion of the holder to receive the slidable tray and replaceable means for trapping redirected insects and bugs in the hollow interior of the holder.

4. The kit of claim 3, wherein the replaceable means for trapping redirected insects and bugs comprises a sheet of adhesive material.

5. The kit of claim 3, wherein the means for forcibly preventing contamination by insects and bugs comprises at least one fan configured to create turbulence in a space above the one or more pet food receptacles, the at least one fan securable to the holder.

6. The kit of claim 5, further comprising means for electrically powering the at least one fan.

7. The kit of claim 3, wherein the means for redirecting bugs and insects is comprises at least one of a light source, a pheromone scented substance, and a sweetly fragrant substance, disposable within the hollow interior of the holder.

8. The kit of claim 7, further comprising means for electrically powering any light source disposable within the hollow interior of the holder.

* * * * *